(12) United States Patent
Garbelli

(10) Patent No.: US 11,920,598 B2
(45) Date of Patent: Mar. 5, 2024

(54) COOLANT PUMP FOR A VEHICLE

(71) Applicant: BARUFFALDI S.P.A., Tribiano (IT)

(72) Inventor: Marco Garbelli, Tribiano (IT)

(73) Assignee: BARUFFALDI S.P.A., Tribiano (IT)

(*) Notice: Subject to any disclaimer, the term of this patent is extended or adjusted under 35 U.S.C. 154(b) by 76 days.

(21) Appl. No.: 17/613,776

(22) PCT Filed: Jun. 19, 2020

(86) PCT No.: PCT/IB2020/055770
§ 371 (c)(1),
(2) Date: Nov. 23, 2021

(87) PCT Pub. No.: WO2020/261077
PCT Pub. Date: Dec. 30, 2020

(65) Prior Publication Data
US 2022/0228591 A1 Jul. 21, 2022

(30) Foreign Application Priority Data
Jun. 24, 2019 (IT) .......................... 102019000009909

(51) Int. Cl.
F04D 13/06 (2006.01)
F01P 5/12 (2006.01)
(Continued)

(52) U.S. Cl.
CPC ................ F04D 13/06 (2013.01); F01P 5/12 (2013.01); F01P 7/084 (2013.01); F01P 7/162 (2013.01); F01P 7/164 (2013.01); F04D 1/00 (2013.01); F04D 13/02 (2013.01); F04D 13/021 (2013.01); F04D 13/024 (2013.01); F04D 13/027 (2013.01); F04D 15/0066 (2013.01); F16D 13/76 (2013.01); F16D 27/112 (2013.01); F01P 2005/125 (2013.01)

(58) Field of Classification Search
CPC ........ F16D 27/112; F16D 13/76; F04D 13/06; F04D 13/021; F04D 15/0066; F04D 13/027; F04D 13/02; F04D 1/00; F04D 13/024; F01P 5/12; F01P 7/164; F01P 2005/125; F01P 7/162; F01P 7/084
See application file for complete search history.

(56) References Cited

U.S. PATENT DOCUMENTS 9,279,460 B2 * 3/2016 Qin ....................... F16D 48/064
9,482,286 B2 * 11/2016 Qin ........................ F04D 13/06
(Continued)

Primary Examiner — Peter J Bertheaud

(57) ABSTRACT

A Pump for recirculating a cooling fluid of a vehicle comprises a pump body, which is fixed during use; an impeller mounted on a driven shaft; with a friction coupling of the electromagnetic type, made of a fixed electromagnet, a rotor and an armature. A pulley for taking up a rotational movement is connected to a movement source such as a shaft of the combustion engine of the vehicle and mounted on an outer bearing keyed onto the pump body. An electric motor is provided for driving the driven shaft independently of the movement take-up pulley; and a bell member is fastened to an end of the driven shaft opposite to that which carries the impeller.
The friction coupling is designed to rotationally couple/decouple the pulley and bell member and the electric motor is arranged inside the bell member on the opposite side to the impeller relative to friction coupling.

17 Claims, 2 Drawing Sheets

(51) Int. Cl.
*F01P 7/08* (2006.01)
*F01P 7/16* (2006.01)
*F04D 1/00* (2006.01)
*F04D 13/02* (2006.01)
*F04D 15/00* (2006.01)
*F16D 13/76* (2006.01)
*F16D 27/112* (2006.01)

(56) References Cited

U.S. PATENT DOCUMENTS

| | | | | |
|---|---|---|---|---|
| 9,523,393 | B2 * | 12/2016 | Roby | F16D 27/11 |
| 9,765,827 | B2 * | 9/2017 | Qin | F04D 13/06 |
| 11,085,449 | B2 * | 8/2021 | Modica | F04D 13/027 |
| 11,143,087 | B2 * | 10/2021 | Boffelli | F04D 13/024 |

* cited by examiner

COOLANT PUMP FOR A VEHICLE

CROSS-REFERENCE TO RELATED APPLICATIONS

The present application is a national stage entry of International patent application no. PCT/162020/055770, filed on May 21, 2020, which claims priority to Italian patent application no. 102019000009909 filed on Jun. 24, 2019, both of which are incorporated in their entirety.

STATEMENT REGARDING FEDERALLY SPONSORED RESEARCH OR DEVELOPMENT

Not applicable.

THE NAMES OF THE PARTIES TOA JOINT RESEARCH AGREEMENT

Not applicable.

AN INCORPORATION BY REFERENCE STATEMENT FOR SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The present invention relates to a pump for recirculating a cooling fluid for a vehicle, in particular the cooling fluid for vehicle combustion engines, with a control system comprising an electromagnetic friction coupling and an independent electric motor.

It is known in the sector for the production of vehicles, in particular engines, for example combustion engines, that there exists the need to cool said engines by means of recirculation of a cooling fluid which is driven by means of a corresponding recirculating pump, the impeller of which is rotated by a shaft driven by means for taking up a rotational movement, generally comprising a pulley, and by a belt connected to a movement source such as in particular a drive shaft.

It is also known that the recirculation of the cooling fluid must be performed with a flowrate depending on the actual cooling requirement determined by the real conditions of use of the engine and by the external temperature, in order to avoid the constant and unnecessary operation at full speed of devices which draw useful power, thereby increasing the wear of the various component parts and the fuel consumption of the vehicle.

It is also known that, in order to solve this problem, devices have been proposed for controlling operation of the pump impeller, rotation of which depends on the engagement of a friction coupling for transmission of a rotational movement depending on the revolutions of the drive shaft, and on an electric motor which instead is activated when the friction coupling is disengaged, so as to ensure a controlled speed rotation independent of the drive shaft.

Examples of these devices are for example known from WO 2012/142065 and WO 2018/229669 on which the claimed invention is based.

Although fulfilling their function, these devices nevertheless have drawbacks which limit their applications, in particular since they envisage the positioning of the friction coupling in a position axially on the outside of the pulley for taking up the movement from the drive shaft, thereby resulting in an increase in the axial dimensions of the assembly which is incompatible with the small dimensions of the seats for housing the assembly inside the engine compartment. Similar problems arise in the case of secondary or auxiliary cooling circuits, which are not directly designed to cool the engine, but which require in any case recirculation of the cooling fluid.

The technical problem which is posed therefore is that of providing a pump for recirculating cooling fluid, in particular a cooling fluid for vehicle engines and the like, able to produce a variation in the speed of rotation of the impeller depending on the actual requirements.

In connection with this problem it is also required that this device should have small dimensions—in particular axial, but also radial dimensions—but at the same time should be able to produce high torques also at a slow speed of rotation of the engine, so as to be applicable also to high performance pumps of heavy vehicles with an engine operating at a low number of rpm, or rotation of the impeller at a slow speed in conditions where the combustion engine is operating at a high number of rpm.

It is also required the device should be easy and inexpensive to produce and assemble and be able to be easily installed on the pump body without the need for special adaptation.

These results are obtained according to the present invention by a pump for recirculating cooling fluids for engines of vehicles and the like according to the present disclosure.

Owing to the pump configuration of the present invention, in which the movement take-up means, in particular in the form of a pulley, are formed on an outer circumferential edge of a shaped circular ring which forms part of the rotor of an electromagnetic friction coupling, are mounted on a bearing on the outside of the pump body and are arranged in a position radially more outer lying than the electromagnet and/or the armature of the friction coupling, it is possible to obtain a pump, the impeller of which may be rotationally driven according to the actual requirements and which is axially very compact, while allowing a great degree of flexibility with regard to design of the dimensions of the movement take-up means and/or the bell member and/or the electromagnetic coupling and the outer bearing.

In fact, the pump according to the invention provides the designer with a great degree of freedom as regards the design of the dimensions of the movement take-up means, for example in the form of a pulley with a suitable axial length to be coupled with a belt, but also of the bearing supporting the same and the transmittable torque of the electromagnetic coupling, without an increase in the axial dimensions. Moreover, the rotor and the bell member for operation by means of the electric motor may be more freely designed in terms of their dimensions. Therefore, it is possible to adapt the pump to the actual cooling requirements of the vehicle, while keeping at the same time the overall axial dimensions thereof compact.

In particular, in preferred embodiments, the movement take-up means may be arranged in a position which is radially more outer lying than the bell member, thus resulting in the maximum degree of freedom with regard to the design of the axial dimensions thereof and/or in a gain in volume between the movement take-up means and a part of the pump body which houses the impeller.

According to preferred configurations, the movement take-up means may be at least partially arranged axially above the electromagnet and preferably arranged concentrically therewith. The electric motor and/or the bell member may be arranged in an axially outer position with respect to the movement take-up means (not arranged above them).

According to further preferred configurations, the movement take-up means are at least partially arranged axially above the armature and optionally the bell member. In particular, the circular ring on the outer circumferential edge of which the movement take-up means are formed may project axially from a body of the rotor which is mounted on the outer bearing, towards the end of the driven shaft fastened to the bell member, optionally also until it is arranged axially above the bell member itself.

BRIEF DESCRIPTION OF THE SEVERAL VIEWS OF THE DRAWING

Further details may be obtained from the following description of non-limiting examples of embodiment of the subject of the present invention provided with reference to the attached drawings in which.

DETAILED DESCRIPTION OF THE INVENTION

Figure 1:
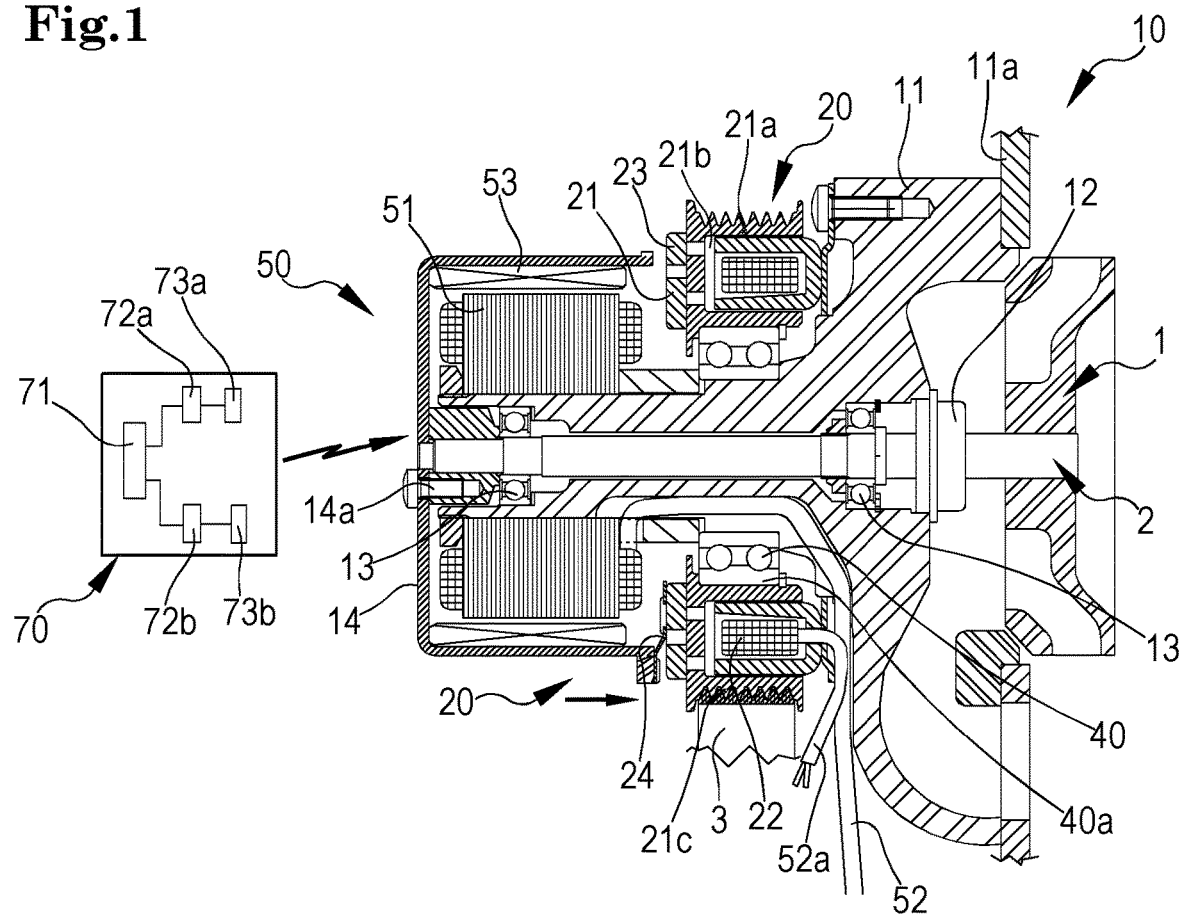
FIG. 1: shows a partially sectioned view of an example of embodiment of the device according to the present invention, in conditions where the friction coupling is closed and the motor is energized.

As shown in FIG. 1, the impeller 1 of a pump for recirculating a cooling fluid for vehicles and the like is mounted on a first end of a shaft 2 supported by a fixed group 10 comprising a pump body 11 which in turn is fixed to the base 11a of the engine of the vehicle.

Sealing means, in particular a sealing gasket 12, coaxial with the shaft 2, are arranged inside the pump body 11.

The shaft 2 of the impeller is designed to rotate with respect to the pump body 11, in particular by means of internal bearings 13, on the inner ring of which the said shaft 2 is keyed.

On the outside of the pump body 11 there is keyed an outer bearing 40, the outer ring 40a of which is integral with a suitably shaped circular ring 21a, the outer circumferential edge of which has, formed thereon, movement take-up means, in the example in the form of a pulley 21c, suitable for coupling with a belt 3 for taking up the movement from the shaft of the combustion engine and transmission to the ring 21a itself, generating the rotational movement for the shaft 2 of the pump.

Since the pulling force of the belt 3 is transmitted onto the outer bearing 40 it is possible to limit the size of the inner bearings 13 which are not subject to dynamic loads, thus increasing the working life and limiting the overall dimensions.

The circular ring 21a forms part of the rotor 21 of an electromagnetic coupling 20 which comprises a fixed electromagnet 22 housed inside a corresponding seat 21b of the rotor 21 itself, and an armature 23 arranged facing the electromagnet 22 on the opposite side thereto relative to the impeller 1.

The armature 23 is connected to a resilient recall lamina 24 in turn fixed to a bell member 14 to be rotated (described more fully below) and designed to allow an axial displacement of the armature, but prevent it from performing relative rotational movements with respect to the said bell member.

The rotor 21 may be provided with through-openings in the axial direction for defining the path of the magnetic flow able to determine the force of attraction of the armature 23.

With this coupled arrangement, the armature 23 is able to perform movements in the axial direction towards/from the rotor 21, being prevented from performing a relative rotation with respect to the bell member 14 when the electromagnet 22 is energized or de-energized.

As shown in FIG. 1, it is also envisaged that in the an electric motor 50 is provided in a position axially on the outside of the pulley 21c and the friction coupling 20, the stator 51 thereof being supported by the pump body 11 and the rotor 53 thereof being connected to the bell member 14 which is in turn axially connected to the end of the pump shaft 2 opposite to the impeller 1.

The connection between bell member and shaft is performed using conventional means 14a (not described in detail).

As shown, the electric motor 50, which is preferably of the brushless or asynchronous type, is arranged in a position axially on the outside of the electromagnet 22. The electromagnetic coupling 20 is preferably arranged axially between the pump impeller and the electric motor.

As shown, the pulley 21c which forms the movement take-up means is formed on the outer edge of a circular ring of the rotor 21, radially on the outside of the seat 21b of the electromagnet 22. In this embodiment, the pulley 21c is also situated radially more outer lying than both the armature 23 and the bell member 14.

Preferably, the movement take-up means, in particular the pulley 21c and the electromagnetic coupling, in particular at least the electromagnet 22, are arranged concentrically. With such a configuration it is possible to ensure the maximum freedom for design of the dimensions (including the radial dimensions) of the bell member 14 and the electric motor 50, in particular when the movement take-up means are arranged in an axially outer position with respect to the said bell member 14 and optionally the armature 23 (and not arranged above them).

The electric power supply for the motor may be provided for example by means of a cable 52 connected to an energy source, such as an electric power supply for the engine.

Independently of the power supply for the motor 50, a second power supply for energizing the electromagnet via wires 52a is provided.

With this configuration the operating principle of the pump is as follows:

A) when the electromagnet 22 is energized (FIG. 2), the magnetic field induced overcomes the recall action of the resilient lamina 24, axially recalling the armature 23 against the rotor 23 which causes rotation of the bell member 14 and therefore the shaft of the pump which is connected to the latter and which in turn causes rotation of the impeller 1 at the same number of revolutions as the pulley 21c and the ring 21a;

B) when the electromagnetic 22 is de-energized (FIG. 1), the armature 23 is axially recalled by the resilient lamina 24 away from the rotor 21 and against the bell member 14 which is then disengaged from the driving movement supplied by the belt 3 connected to the combustion engine; the driven shaft 2 is in the idle condition and the impeller is at a standstill;

C) if, in the idle condition of the shaft 2, a rotation of the impeller 1 with an independent number of revolutions, for example less than that determined by the rotor 21b of the electromagnetic coupling 20, is required, the electric motor 50 is powered so that the movement of the electric rotor 53 causes rotation of the bell member 14 and therefore the shaft 2 at the desired speed of rotation suitable for determining recirculation of the fluid which is actually required.

In a first embodiment, the electric motor is designed with a single winding on the poles of the stator, said form being advantageous if the amount of material used and the costs are to be kept to a minimum.

According to a further embodiment it is envisaged that the electric motor 50 comprises at least one pair of windings on the poles of the stator which are connected in cascade to a drive 70 which controls the motor which may for example a brushless or asynchronous motor.

The drive 70 may comprise in turn a twin-section configuration with a CPU 71 which controls a first driver 72a and a second driver 72b for driving a respective first bridge 73a and second bridge 73b; in this way it is possible to provide a configuration known by the term "fail-safe" such that, in the event of malfunctioning or breakage of one of the windings and/or one of the sections of the drive 70, the other winding nevertheless becomes operative, ensuring the movement of the impeller 1 and therefore recirculation of the cooling fluid for the combustion engine.

Figures 2, 3:
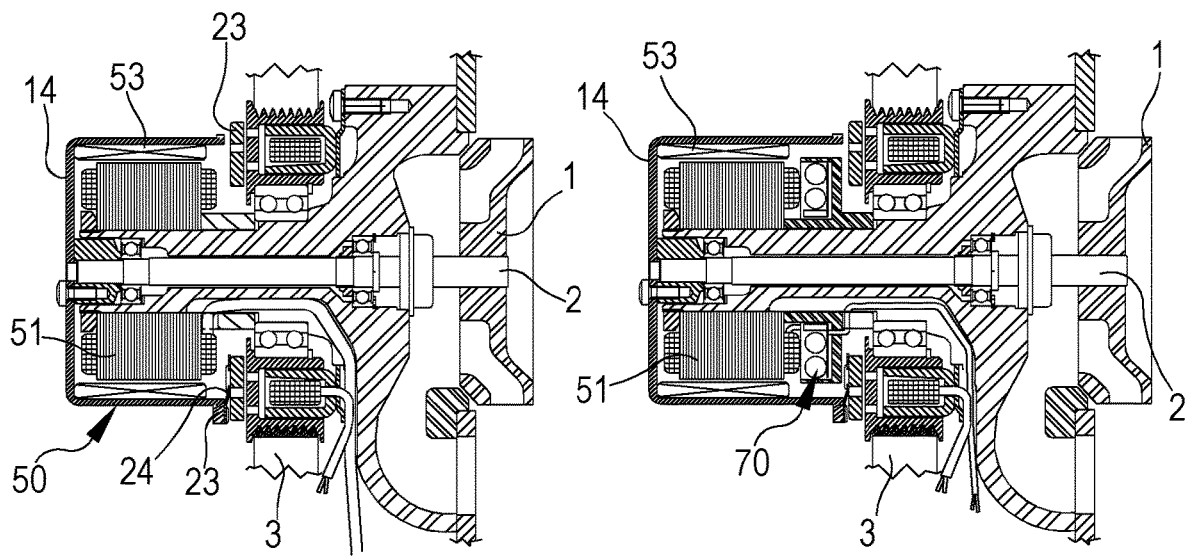
FIG. 2: shows a view similar to that of FIG. 1 in conditions where the friction coupling is open and the motor is not energized.
FIG. 3: shows a view, similar to that of FIG. 1, of a further of embodiment of the pump according to the invention.

As shown, the drive may be provided on the outside of the motor (FIG. 1) or arranged on-board the pump, preferably within the axial dimensions or inside the volume of the bell member 14, as schematically shown in FIG. 3.

It is also envisaged that the two windings may comprises a different number of polarities for providing different driving torques: for example a high torque for normal operation and low torque for emergency fail-safe operation.

In any case a fail-safe function may be always ensured by an independent drive via an electric motor or electromagnetic coupling connected to different movement take-up means.

Figure 4:
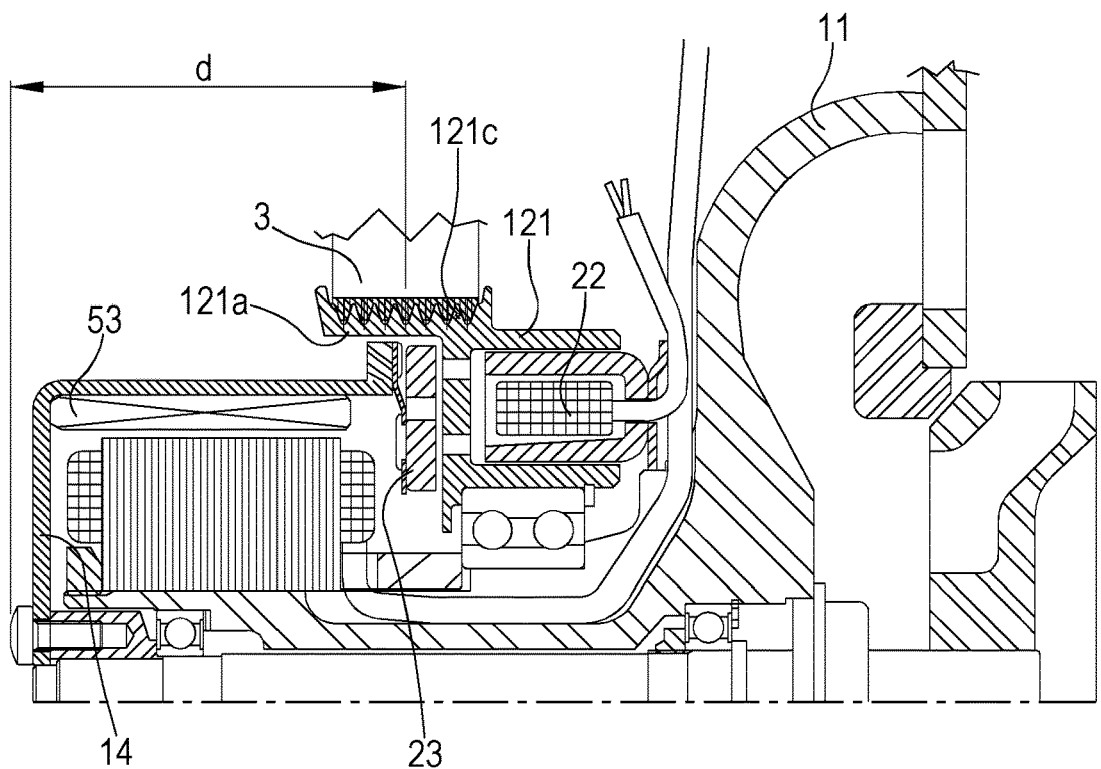
FIG. 4: shows a third embodiment of a pump according to the invention.

In preferred embodiments, a preferred example of which is shown in FIG. 4, the movement take-up means, in particular a pulley 121c, are arranged in a position radially more outer lying than the bell member 14 and are arranged at least partially axially above the armature 23.

In these embodiments, the movement take-up means 121c may be extended so as to be arranged at least partially above the bell member 14 and optionally also the electric motor 50.

In greater detail, the shaped circular ring 121a, on the outer circumferential circular edge of which the movement take-up pulley 121c is formed, is composed at least partly by a projecting coaxial extension of the rotor 121 of the coupling; namely, the rotor comprises a body 121 which is keyed onto the outer bearing 40 (and includes the seat 122 for the electromagnet) and from which at least a part of the circular ring 121a projects axially in the direction of the end of the driven shaft 2 fastened to the bell member 14.

With this configuration, the movement take-up means may be arranged axially at least partly above the armature 23 and optionally also the bell member 14, this allowing a great freedom to increase the axial dimensions of the movement take-up means and therefore increase the pulling force of the belt 3 without increasing the overall axial dimensions of the pump; in this way a space between the belt edge 3 and the end of the driven shaft 2 fastened to the bell member 14 is reduced.

As shown in FIG. 4 it is also possible to displace the entire ring part 121a with pulley 121c towards the bell member end of the driven shaft, preferably so that it is axially on the outside of the electromagnet 22, so as to gain volume between the movement take-up means and the part of the body 11 of the pump which houses the impeller 1, for the same overall axial size.

Such a greater volume allows greater freedom to design the dimensions of the outer bearing 40 and/or the electromagnetic coupling, allowing optimum definition of the transmittable torque value of the coupling and/or preventing any constructional complications (e.g. due to welded eyelets). It will be clear to the person skilled in the art that in this configuration the movement take-up means 121c could also be arranged radially more inner lying than the electromagnet 22 of the friction coupling.

Figure 5:
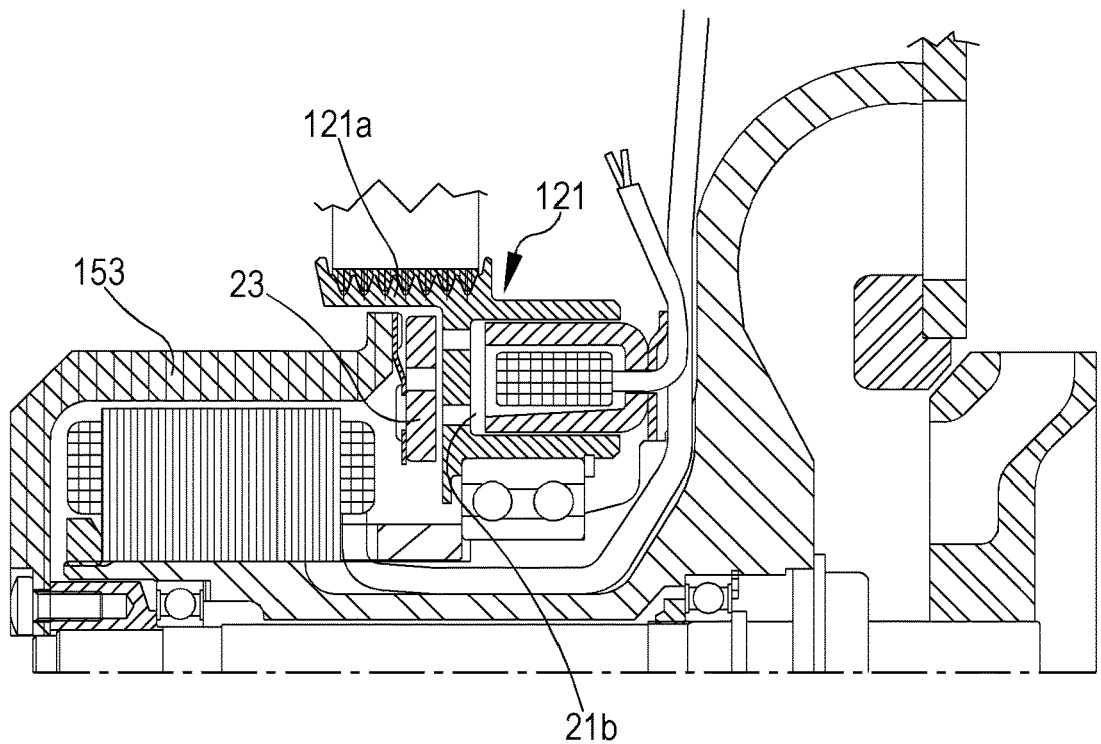
FIG. 5: shows a fourth embodiment of a pump according to the invention.

FIG. 5 shows a further embodiment of the pump according to the invention, which differs from that shown in FIG. 4 in that the electric rotor 153 forms part of single body made of plastomagnetic material which also forms the bell member fastened to the driven shaft 2 and connected to the armature 23 of the electromagnetic coupling.

In particular, the rotor/bell member 153 has a body formed as a single pressed part, comprising a hollow cylinder coaxial with the driven shaft 2 and a circular rear closing plate fastened to the said shaft; said body is made, in particular by means of injection-moulding, of a plastomagnetic material consisting essentially of a plastic binder and at least 50%, preferably at least 80%, more preferably at least 90%, 93%, 95% or 99% by weight of a ferromagnetic metal which can be magnetized in a permanent manner, such as ferrite, neodymium or samarium cobalt. The body formed as one piece is magnetized with Halbach magnetization so as to reproduce inside the hollow cylinder, which forms part of an electric rotor, a permanent magnetic field with at least two magnetic poles and on the outside of the hollow cylinder a substantially zero magnetic field.

The plastic binder may be a polyamide, preferably PA6, PA12, PA66 or PPS. The single-piece body is for example injection-moulded from a preform of the plastomagnetic material. The magnetic field inside the hollow cylinder may for example have at least 2, at least 4 or at least 8 magnetic poles arranged angularly equidistant on the circumferential extension of the internal volume of the cylinder. The magnetic poles of the field of the rotor may be inclined at a predefined skew angle, for example of 20°.

As shown in FIG. 5, the bell member/rotor 153 has a central through-hole passing through the plate, configured to house stably an element for connection to the pump shaft, in particular a metal bush and/or a fixing screw. Advantageously, the hole and optionally the bush may be formed during the injection-moulding step.

As shown, the single body made of plastomagnetic material may also comprise a circumferential radial base, to which the armature of the electromagnetic coupling is connected, in a manner similar to the bell member 14 described above.

An example of a method for forming an external rotor 153 made of plastomagnetic material may for example comprise the following steps:

preparation of a preform, for example a ball, made of a plastomagnetic material consisting essentially of at least 50%, preferably at least 80%, more preferably 90%, even more preferably at least 93%, 95% or 99% by weight of a permanently magnetizable metal, in particular ferrite or neodymium or samarium cobalt, and, for the remaining part, of a plastic binder, in particular a polyamide, preferably PA6, PA12, PA66 or PPS;

moulding, preferably by means of injection, the preform inside a mould so as to form a rotor body comprising a hollow cylinder extending around a longitudinal axis and closed by a circular plate at one of its two bases;

magnetization of at least the hollow cylinder of the body so as to provide a Halbach array which produces a permanent magnetic field of the rotor which has at least two magnetic poles in the internal volume of the hollow cylinder and is substantially zero on the outside thereof.

It is therefore clear how with the pump according to the invention it is possible to obtain effective recirculation of the cooling fluid for vehicles which may be varied depending on the actual requirement by means of the alternative operation by an external movement source, such as the combustion engine, or an auxiliary electric motor, while keeping the overall axial dimensions small owing to the particular arrangement of the rotational movement take-up means which are designed for connection to the combustion engine itself and are arranged between the impeller and the bell member and radially more outer lying than the electromagnet, the armature and optionally the bell member and the electric motor, so that the definition of the dimensions during the design stage of each drive may also be adapted to the actual cooling requirement of the vehicle while keeping the overall axial dimensions compact.

In addition to the above, the small radial size of the pulley, which incorporates also the rotor function of the electromagnetic coupling, makes the device, and therefore the pump, suitable also for vehicles with engines which run at a low number rpm, but require a high rotational speed of the cooling pump. Since the pulley extends in the axial direction from the rotor body it is also advantageously possible to increase the pulling force of the belt and/or gain volume for other components of the pump, without increasing the overall axial dimensions.

In addition, the pump according to the invention ensures the rotation of the impeller 1 also in the case of electrical failure of either one of the two independent power supply circuits, i.e. of the motor or the electromagnetic coupling, ensuring the recirculation of the cooling fluid ("fail-safe mode).

It is also envisaged that, when the electromagnet 122 is de-energized, the pump may be operated by the electric motor 50:

at a slow speed when the combustion engine has a high number of revolutions; and with a suitable speed also when the combustion engine is not running, so as to ensure recirculation and therefore cooling of the combustion engine also in the case of temporary stoppages such as stop-and-go conditions in the vicinity of traffic lights.

A further advantageous effect of the structure according to the invention consists in the absence of radial loads, due to the pulling force of the belt 3, acting on the bearings supporting the impeller shaft, said absence helping increase the working life of the bearings and reducing the risks of malfunctioning.

Although described with reference to a circuit for cooling a vehicle combustion engine, it is envisaged that the pump according to the invention may perform the recirculation of a fluid for cooling also other secondary or auxiliary circuits of the vehicle, by deriving the movement where possible also from sources other than the drive shaft.

The invention claimed is:

1. A pump for recirculating a cooling fluid for a vehicle, comprising:
   a pump body (11), which is fixed during use;
   an impeller (1) mounted on a driven shaft (2);
      at least one friction coupling (20) of the electromagnetic type, comprising a fixed electromagnet (22), a rotor (21;121) and an armature (23);
   movement take-up means (21c;121c) for taking up a rotational movement, configured to be connected to a movement source;
   said movement take-up means (21c) being mounted on an outer bearing (40) keyed onto the pump body (11);
      an electric motor (50) for driving the driven shaft (2) independently of the movement take-up means (21c; 121c);
      a bell member (14;153) fastened to an end of the driven shaft opposite to that which carries the impeller,
   wherein the friction coupling is designed to rotationally couple/decouple the movement take-up means (21c;121c) and the bell member (14;153);
   wherein said electric motor (50) is arranged inside the bell member (14) on a side opposite to the impeller (1) relative to the friction coupling (20);
   and wherein
   said movement take-up means (21c;121c) is formed on an outer circumferential edge of a shaped circular ring (21a; 121a) which forms part of said rotor (21) and is arranged in a position radially more outer lying than the electromagnet (22) and/or the armature (23) of the friction coupling.

2. The pump according to claim 1, wherein said movement take-up means comprises a pulley (21a) which is formed on the outer circumferential edge of the circular ring (21a) and is suitable for coupling with a corresponding movement transmission belt (3).

3. The pump according to claim 1, wherein the movement take-up means (21c) is arranged in a position which is radially more outer lying than the bell member (14;153).

4. The pump according to claim 1, wherein the armature (23) of the friction coupling is axially arranged on an opposite side of the electromagnet (22) to the pump impeller and is connected to the bell member (14;153).

5. The pump according to claim 1, wherein said rotor (21;121) also forms an element for closing the magnetic flux generated by the electromagnet and/or wherein said rotor (21;121) includes a seat (21b) inside which the fixed electromagnet (22) is housed.

6. The pump according to claim 1, wherein said bell member (14) is provided with a resilient lamina (24) connected to the armature of the electromagnetic friction coupling.

7. The pump according to claim 1, wherein the movement take-up means (21c) is at least partially arranged axially overlapping the electromagnet (22).

8. The pump according to claim 7 wherein the movement take-up means (21c) is arranged concentrically with the electromagnet (22).

9. The pump according to claim 1, wherein the electric motor (50) and/or the bell member (14) is/are arranged in a position axially on the outside of the movement take-up means (21c).

10. The pump according to claim 1, wherein the movement take-up means (121c) is at least partially arranged axially overlapping the armature (23) and optionally the bell member (14;153).

11. The pump according to claim 1, wherein the circular ring (121a), on the outer circumferential edge of which the movement take-up means is formed, projects axially towards the end of the driven shaft opposite to the impeller-carrying end, fastened to the bell member (14;153), from a body of the rotor (121) mounted on the outer bearing (40).

12. The pump according to claim 1, wherein the electric motor (50) is of the brushless or asynchronous type.

13. The pump according to claim 1, wherein the electric motor (50) has an electric rotor (53) connected to the bell member (14) for rotational operation thereof and/or wherein the electric rotor and the bell member (153) are formed as a single body made of plastomagnetic material.

14. The pump according to claim 1, comprising a first power supply circuit (52a) for the electric motor (50) and a second power supply circuit (52a) for the electromagnetic coupling (20), wherein the first power supply circuit and the second power supply circuit are independent.

15. The pump according to claim 1, wherein the electric motor (50) has a single stator winding or the electric motor (50) comprises at least one pair of windings on the poles of the stator which are connected in cascade to a drive (70) which controls the electric motor.

16. The pump according to claim 15, characterized in that the drive (70) which controls the electric motor comprises a twin-section configuration with a CPU (71) which controls a first driver (72a) and a second driver (72b) for driving a respective first bridge (73a) and second bridge (73b) for controlling respective different pairs of windings of the electric motor.

17. The pump according to claim 1, wherein a drive (70) for the electric motor is located within a volume of the bell member (14).

\* \* \* \* \*